United States Patent
Hsu et al.

(10) Patent No.: US 10,381,888 B2
(45) Date of Patent: Aug. 13, 2019

(54) MOTOR DRIVING METHOD

(71) Applicant: INDUSTRIAL TECHNOLOGY RESEARCH INSTITUTE, Hsinchu (TW)

(72) Inventors: Ming-Mao Hsu, Taichung (TW); Yu-Yuan Chen, Zhubei (TW); Tsu-Min Liu, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 109 days.

(21) Appl. No.: 15/851,206

(22) Filed: Dec. 21, 2017

(65) Prior Publication Data
US 2019/0190327 A1 Jun. 20, 2019

(30) Foreign Application Priority Data
Dec. 20, 2017 (TW) .............................. 106144870 A

(51) Int. Cl.
*H02K 1/24* (2006.01)
*H02P 25/08* (2016.01)
(Continued)

(52) U.S. Cl.
CPC .............. *H02K 1/246* (2013.01); *H02K 17/02* (2013.01); *H02K 19/103* (2013.01); *H02P 6/08* (2013.01); *H02P 21/34* (2016.02); *H02P 25/08* (2013.01)

(58) Field of Classification Search
CPC ...... H02P 1/00; H02P 1/04; H02P 1/46; H02P 3/18; H02P 23/00; H02P 27/00; H02P 25/00; H02P 3/00; H02P 3/065; H02P 4/00; H02P 5/00; H02P 5/46; H02P 6/00; H02P 6/04; H02P 6/06; H02P 9/46; H02P 21/00; H02P 21/0042; H02P 21/0046;
(Continued)

(56) References Cited

U.S. PATENT DOCUMENTS 4,763,058 A * 8/1988 Heining ................. H02P 21/34
318/798
2016/0329787 A1 11/2016 Ito et al.

FOREIGN PATENT DOCUMENTS

CN 2555578 Y 6/2003
CN 101931363 B 12/2011
(Continued)

OTHER PUBLICATIONS

Alejandro J. Pina, "Comparison of Apparent Power Consumption in Synchronous Reluctance and Induction Motor Under Vector Control", Transportation Electrification Conference and Expo IEEE, Jun. 14, 2015.
(Continued)

*Primary Examiner* — Antony M Paul
(74) *Attorney, Agent, or Firm* — Maschoff Brennan

(57) ABSTRACT

A motor driving method is applied to a motor with a rotor comprising a magnetic reluctance structure. The motor driving method comprises enabling the motor by an asynchronous driving method, controlling the motor by the asynchronous driving method according to a speed regulation command, detecting a rotor speed of the motor and determining whether the rotor speed is larger than a speed threshold, and when the rotor speed is larger than the speed threshold, controlling the motor by a synchronous driving method.

6 Claims, 3 Drawing Sheets

(51) Int. Cl.
  *H02P 21/34*  (2016.01)
  *H02K 19/10*  (2006.01)
  *H02K 17/02*  (2006.01)
  *H02P 6/08*   (2016.01)

(58) Field of Classification Search
  CPC ...... H02P 21/06; H02P 21/10; H02P 23/0027;
       H02P 23/08; H02P 25/08; H02P 27/04;
       H02P 27/047; H02P 27/06; H02K 19/12
  USPC ..... 318/400.01, 400.02, 700, 701, 727, 779,
                          318/799, 800, 801, 430
  See application file for complete search history.

(56) References Cited

FOREIGN PATENT DOCUMENTS

| | | |
|---|---|---|
| CN | 104426431 A | 3/2015 |
| CN | 105529966 A | 4/2016 |
| CN | 106685291 A | 5/2017 |
| TW | I572121 B | 2/2017 |

OTHER PUBLICATIONS

Tian-Hua Liu, "Controller Design for Synchronous Reluctance Motor Drive Systems with Direct Torque Control", Feb. 10, 2011, Torque Control.

Alejandro Jose Pina Ortega, "Design and Comparison of Induction Motor and Synchronous Reluctance Motor for Variable Speed Applications: Design Aided by Differential Evolution and Finite Element Analysis", Ohio State University, May 2013.

M. Gamba et al., "Design of a Line-Start Synchronous Reluctance motor", Electric Machines & Drives Conference IEEE, May 12, 2013.

Thierry Lubin et al., "On-line efficiency optimization of synchronous reluctance motor", Electric Power Systems Research 77, 484-493, Apr. 25, 2006.

Arzhang Yousefi-Talouki et al., "Sensorless Direct Flux Vector Control of Synchronous Reluctance Motor Drives in a Wide Speed Range Including Standstill", Electrical Macines IEEE, Nov. 3, 2016.

\* cited by examiner

MOTOR DRIVING METHOD

TECHNICAL FIELD

This disclosure relates to a motor driving method.

BACKGROUND

Nowadays, a motor is an indispensable power component. The motor can convert electric energy into kinetic energy, so it is widely used in the apparatus such as a machine tool, water pump, light industry machinery, wind power generation, hydropower generation, electric vehicle, etc. Due to high demand in the market, the design and manufacture of various motors and the technology of driving and controlling these motors are rapidly developed.

In general, the driving methods of the motor can be divided into asynchronous drive and synchronous drive. The asynchronous drive is performed by the interaction between the magnetic flux and the induced current generated by the slip between the rotor and the stator so as to control the rotation of the rotor. The synchronous drive is performed by attracting the negative pole of the rotor magnetic field by the magnetic field of the stator, so that the rotor, following the magnetic field of the stator, rotates at the same speed as that of the magnetic field of the stator. The advantages of the asynchronous driving method comprise less being impacted by the environment and having a high starting torque; however, its power factor is low. The synchronous driving method has the advantage of high power factor; however, it is easily impacted by the environment so that it easily fails in the start-up phase or has poor performance at low speeds.

SUMMARY OF THE INVENTION

Accordingly, this disclosure provides a motor driving method for controlling a motor selectively by a synchronous driving method or an asynchronous driving method so that the rotation of the motor may have the advantages of both of the above driving methods.

According to an embodiment of this disclosure, a motor driving method is applied to a motor with a rotor comprising a magnetic reluctance structure, and comprises: starting the motor up by an asynchronous driving method; controlling the motor by the asynchronous driving method according to a speed regulation command; detecting a rotating speed of the rotor of the motor, and determining whether the rotating speed of the rotor is equal to/higher than a threshold rotating speed or not; and controlling the motor by a synchronous driving method when the rotating speed of the rotor is equal to/higher than the threshold rotating speed, wherein the threshold rotating speed is obtained by multiplying a synchronous rotating speed of the motor by a threshold percentage.

In view of the above description, the motor driving method in this disclosure starts the motor up and controls it by the asynchronous driving method in the start-up phase so that the starting current may be effectively limited to allow the rotating speed of the rotor of the motor to smoothly achieve the synchronous rotating speed. Moreover, the motor driving method switches to control the motor by the synchronous driving method before or when the rotating speed of the rotor achieves the synchronous rotating speed, so that the motor may have better operating efficiency, lower steady-state torque or better power factor.

The above description of the summary of this disclosure and the description of the following embodiments are provided to illustrate and explain the spirit and principles of this disclosure, and to provide further explanation of the scope of this disclosure.

DETAILED DESCRIPTION

The detailed features and advantages of the disclosure will be described in detail in the following description, which is intended to enable any person having ordinary skill in the art to understand the technical aspects of the present disclosure and to practice it. In accordance with the teachings, claims and the drawings of the disclosure, any person having ordinary skill in the art is able to readily understand the objectives and advantages of the disclosure. The following embodiments illustrate the disclosure in further detail, but the scope of the disclosure is not limited by any point of view.

Figure 1:
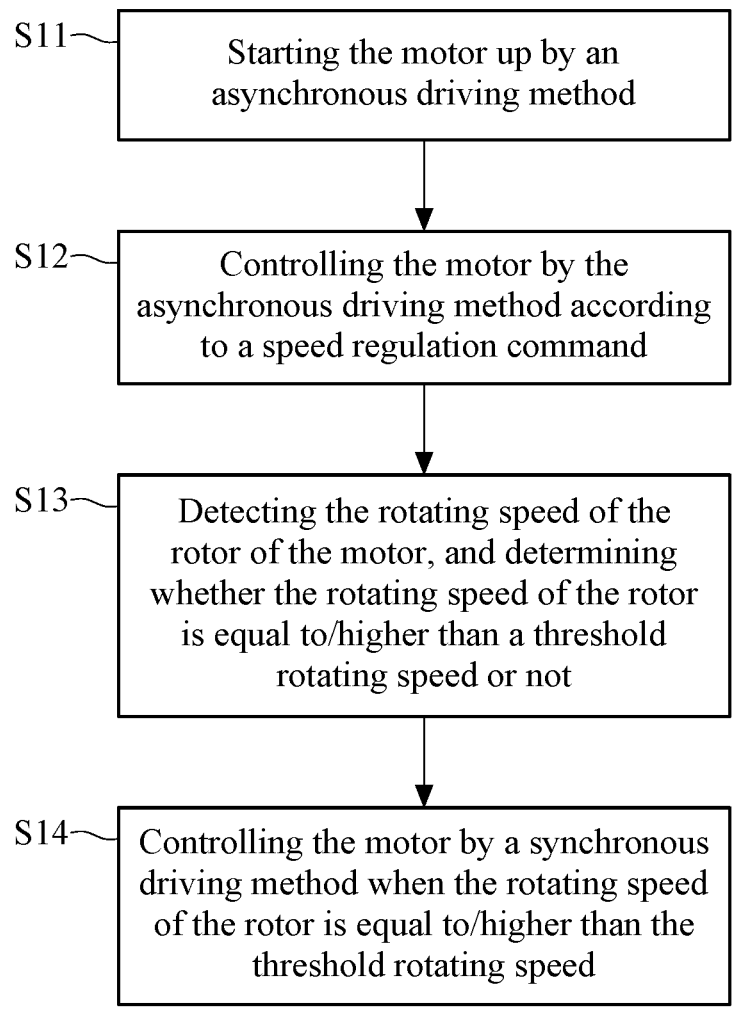
FIG. 1 is a flow chart of a motor driving method according to an embodiment of this disclosure.
Figure 2:
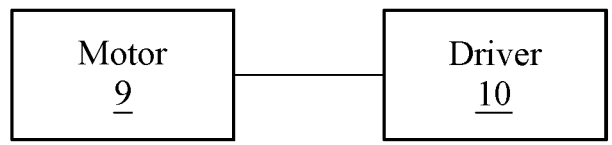
FIG. 2 is a function block diagram for operating a motor driving method according to an embodiment of this disclosure.

Please refer to FIG. 1 and FIG. 2, wherein FIG. 1 is a flow chart of a motor driving method according to an embodiment of this disclosure, and FIG. 2 is a function block diagram for operating a motor driving method according to an embodiment of this disclosure. As shown in FIG. 1 and FIG. 2, a motor driving method comprises steps S11-S14, and applied to a motor 9, wherein the rotor of the motor 9 comprises a magnetic reluctance structure. The embodiment related to the detailing structure of the motor 9 is described later. The motor driving method can be performed by the driver 10 which is electrically connected with the motor 9.

In steps S11-S12, the driver 10 starts the motor 9 up by an asynchronous driving method, and controls the motor 9 by the asynchronous method according to a speed regulation command. The asynchronous driving method is performed by the interaction between the magnetic flux and the induced current generated by the slip between the rotor and the stator, so as to control the rotation of the rotor. For example, the asynchronous driving method can be the variable voltage variable frequency (VVVF) control. The driver 10 generates the speed regulation command comprising a plurality of control commands, and outputs the plurality of control commands in an ascending order of output frequencies, so as to control the motor 9 using the VVVF control. As another example, the asynchronous driving method can also be field orient control (FOC) to individually control the torque and magnetic flux of the motor 9 using coordinate axis transformation.

In steps S13-S14, the driver 10 detects the rotating speed of the rotor of the motor 9, and determines whether the rotating speed of the rotor is equal to/higher than a threshold rotating speed or not. When the rotating speed of the rotor is equal to/higher than the threshold rotating speed, the driver 10 switches to control the rotating speed of the motor 9 by a synchronous driving method. For example, the synchronous driving method can be VVVF control, FOC or other control method.

In an embodiment, the asynchronous driving method of the driver 10 is implemented by VVVF control, and the synchronous driving method is implemented by FOC. In this embodiment, in the start-up and asynchronous phase, the VVVF control may allow the motor 9 to obtain a large starting torque using a small starting current, so as to avoid the life of motor from being reduced due to the situation in which the starting current is so large that the motor 9 is overheated and even that the protector trips. When the rotating speed of the rotor of the motor 9 is equal to or higher than the threshold rotating speed, FOC may individually control the torque and the magnetic flux for providing a better dynamic response, and avoid the problem of torque ripple.

In another embodiment, both of the asynchronous driving and synchronous driving methods of the driver 10 can be implemented by FOC. The driver 10 switches from the asynchronous driving method to the asynchronous driving method by transforming the pre-stored control parameters. Accordingly, the motor in the start-up phase may obtain a large starting torque using a small starting current by the asynchronous driving method; and the motor approaching the steady state may provide the better dynamic response by the synchronous driving method.

Figure 3:
FIG. 3 is a rotor rotating speed versus time diagram of a motor driving method according to an embodiment of this disclosure.

Please refer to FIG. 2 and FIG. 3, wherein FIG. 3 is a rotor rotating speed versus time diagram of a motor driving method according to an embodiment of this disclosure. In FIG. 3, a target rotating speed Ns is preset as the synchronous rotating speed of the motor 9, and the threshold rotating speed Nth is set to be proportional to the target rotating speed Ns; that is, the threshold rotating speed Nth is the target rotating speed Ns multiplied by a threshold percentage. In an embodiment, the threshold rotating speed Nth is set to be equal to the target rotating speed Ns (i.e. the threshold percentage is 100%). In another embodiment, the threshold rotating speed Nth is set to be the maximum asynchronous rotating speed of the motor 9 in the asynchronous mode and under the rated load. In yet embodiment, the threshold rotating speed Nth is set to be the rated rotating speed of a normal induction motor, which indicates the maximum asynchronous rotating speed of the normal induction motor under the rated load. The normal induction motor indicates an induction motor, which has a stator the same as that of the motor of this disclosure but has a rotor only with a magnetic induction structure. Generally, in the case of setting the threshold rotating speed Nth as the related rotating speed of the normal induction motor, the threshold percentage is equal to or larger than 90%.

As shown in FIG. 3, the driver 10 controls the motor 9 by the asynchronous driving method when the driver 10 determines that the rotating speed of the rotor of the motor 9 is lower than the threshold rotating speed Nth; and the driver 10 switches to control the motor 9 by the synchronous driving method when the driver 10 determines that the rotating speed of the rotor of the motor 9 is equal to or higher than the threshold rotating speed Nth. In other words, the driver 10 controls the motor 9 by the asynchronous driving method in the first rotation phase T1; and controls the motor 9 by the synchronous driving method in the second rotation phase T2.

Therefore, the motor driving method in this disclosure starts the motor 9 up and controls it by the asynchronous driving method in the start-up phase (wherein the slip is maximum), so that the starting current may be effectively limited to allow the rotating speed of the rotor of the motor 9 to smoothly achieve the synchronous rotating speed Ns (at this time, the slip is equal to zero). Moreover, the motor driving method switches to control the motor 9 by the synchronous driving method before or when the rotating speed of the rotor achieves the synchronous rotating speed Ns, so that the motor 9 may have better operating efficiency, lower steady-state torque or better power factor.

As aforementioned, the motor driving method in this disclosure is applied to the motor 9 with a rotor comprising a magnetic reluctance structure. In the following, the rotor structure of the motor 9 is exemplified, but the motor to which the motor driving method in this disclosure is applied is not limited thereto. Please refer to FIG. 2 and FIG. 4 wherein is a front view of the rotor structure of the motor 9 applied to the above motor driving method according to an embodiment of this disclosure.

Figure 4:
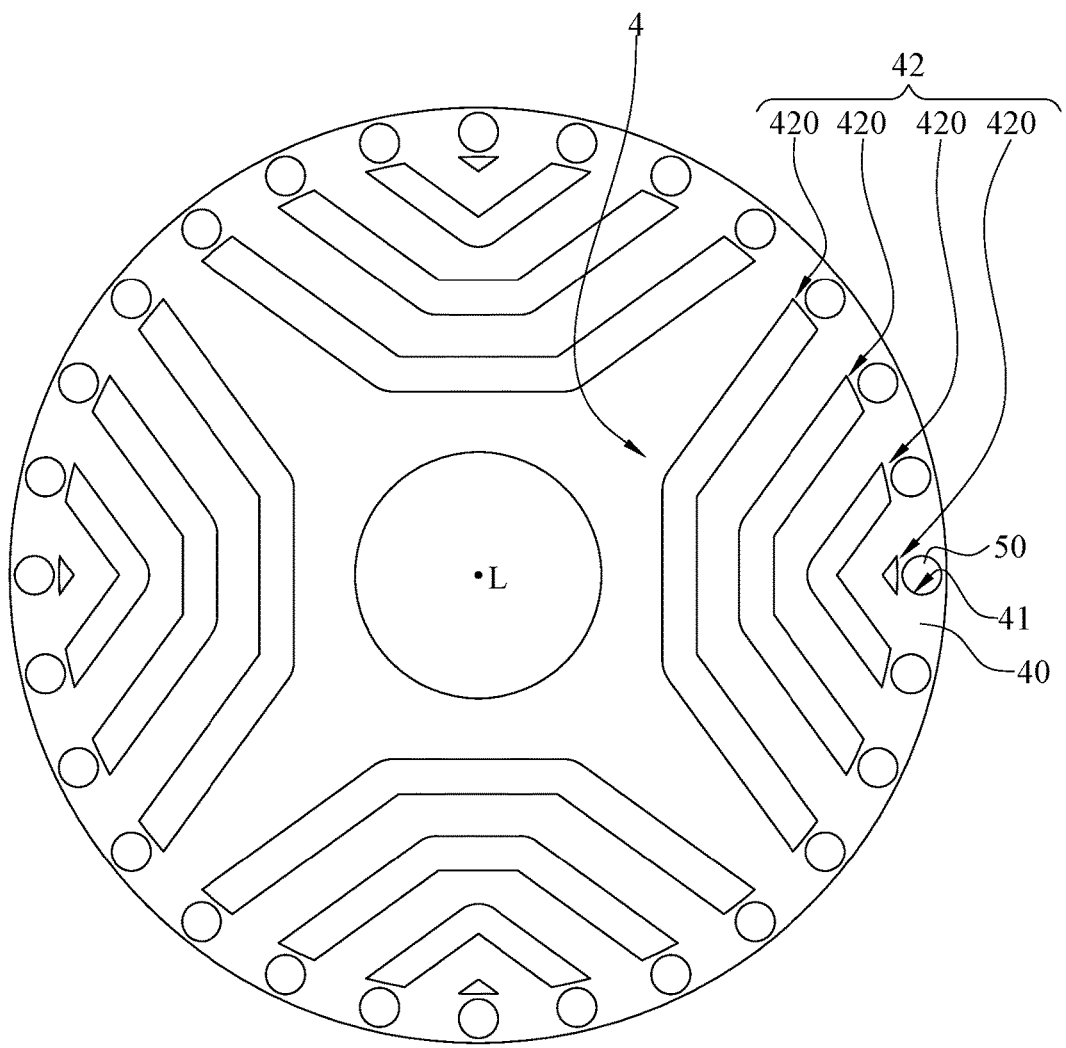
FIG. 4 is a front view of the rotor structure of the motor applied to a motor driving method according to an embodiment of this disclosure.

As shown in FIG. 2 and FIG. 4, the motor 9 has a rotor 1a comprising an iron core (rotor core) 40 and a plurality of conductors (rotor bars) 50. The iron core 40 comprises a plurality of conductor slots 41 and a plurality of magnetic reluctance groups 42.

The conductor slots 41 are arranged along the periphery of the iron core 40. In this embodiment, there is a distance between the conductor slots 41 and the annular sidewall of the iron core 40, and the cross-section of each of the conductor slots 41 is circle. In another embodiment, the conductor slots 41 can also be open slots and are connected with the annular sidewall of the iron core 40. In other embodiments, the cross-sections of the conductor slots 41 can also be pear shape, oval or other geometric shape, which is not limited in this disclosure. The conductors 50 are buried in the rotor and disposed adjacent to the radial outer peripheral surface of the rotor 1a. More specifically, the conductors 50 are respectively disposed in these conductor slots 41.

The magnetic reluctance groups 42 are arranged around the axle center L of the iron core 40. Each of the magnetic reluctance groups 42 comprises a plurality of magnetic reluctance units 420. Each of the magnetic reluctance units 420 extends from one of the conductor slots 41 to another one of the conductor slots 41; that is, each of the magnetic reluctance units 420 extends from one of the conductors 50 to another one of the conductors 50. In an embodiment, there is no permanent magnetic material such as magnet disposed in the rotor, and each magnetic reluctance unit 420 is distanced from the conductor slots 41; that is, the magnetic reluctance units 420 are separated from the conductor slots 41 rather than being connected with the conductor slots 41. In addition, it should be noticed that the number of the poles of the iron core 40 (i.e. the number of the magnetic reluctance groups 42) and the number of the magnetic reluctance units 420 in each magnetic reluctance group 42 can be adjusted based on actual requirements, and they are not limited to the numbers exemplarily shown in the figure in this disclosure.

In this embodiment, the magnetic reluctance units 420 in each magnetic reluctance group 42 are equally spaced from one another and arranged along the radial direction of the iron core 40. In other words, in each pole of the iron core 40, there are three magnetic reluctance units 420 arranged along the radial direction of the iron core 40. However, the magnetic reluctance units 420 are not limited to be equally spaced from one another.

For the iron core 40, each magnetic reluctance unit 420 is the barrier to magnetic flux, and the gap between each two adjacent magnetic reluctance units 420 is the passage of the magnetic flux. The magnetic reluctance groups 42 form a magnetic reluctance structure 4 with a topographic pattern. In principle, the motor winding inputs electric power and the conductors 50 in the iron core 40 corresponding to the stator winding generates an excitation current, so as to make the iron core 40 magnetically conductive to form a closed loop of magnetic flux. At this time, the magnetic flux quantity passing through the unit cross-section area is called magnetic flux density (B). The configuration of the magnetic reluctance structure 4 may not only provide the passage of the magnetic flux of the motor 9 in the asynchronous operation state, but also control the magnetic flux of the excitation in a specific direction so as to make the motor 9 in the synchronous operation state. More particularly, in the synchronous operation state, since the magnetic reluctance units 420 are arranged in the iron core 40, most of the magnetic flux is confined to the gaps between the magnetic reluctance units 420, so that most of the magnetic flux of the excitation is controlled to flow in a specific direction.

In view of the above description, the aforementioned motor driving method in this disclosure starts the motor up and controls it by the asynchronous driving method in the start-up phase so that the starting current may be effectively limited to allow the rotating speed of the rotor of the motor to smoothly achieve the synchronous rotating speed. Moreover, the motor driving method switches to control the motor by the synchronous driving method before or when the rotating speed of the rotor achieves the synchronous rotating speed, so that the motor may have better operating efficiency, lower steady-state torque or better power factor.

Although the aforementioned embodiments of this disclosure have been described above, this disclosure is not limited thereto. The amendment and the retouch, which do not depart from the spirit and scope of this disclosure, should fall within the scope of protection of this disclosure. For the scope of protection defined by this disclosure, please refer to the attached claims.

SYMBOLIC EXPLANATION

9 motor
10 driver
1*a* rotor
4 magnetic reluctance structure
40 iron core
41 conductor slot
42 magnetic reluctance group
50 conductor
420 magnetic reluctance unit
L axle center

What is claimed is:

1. A motor driving method, applied to a motor with a rotor comprising a magnetic reluctance structure, and the motor driving method comprising:
   starting the motor up by an asynchronous driving method;
   controlling the motor by the asynchronous driving method according to a speed regulation command;
   detecting a rotating speed of the rotor of the motor, and determining whether the rotating speed of the rotor is equal to/higher than a threshold rotating speed or not; and
   controlling the motor by a synchronous driving method when the rotating speed of the rotor is equal to/higher than the threshold rotating speed;
   wherein the threshold rotating speed is obtained by multiplying a synchronous rotating speed of the motor by a threshold percentage.

2. The motor driving method according to claim 1, wherein the speed regulation command is generated by a driver electrically connected with the motor, and comprises a plurality of control commands, with the plurality of control commands outputted in an ascending order of output frequencies.

3. The motor driving method according to claim 1, wherein the threshold percentage is 100%.

4. The motor driving method according to claim 1, wherein the threshold rotating speed indicates a maximum asynchronous rotating speed of the motor in an asynchronous mode and under a rated load.

5. The motor driving method according to claim 1, wherein the magnetic reluctance structure of the motor comprises a magnetic reluctance group.

6. The motor driving method according to claim 1, wherein the motor comprises a plurality of conductors disposed in the rotor and adjacent to a radial outer peripheral surface of the rotor.

* * * * *